United States Patent [19]

Burns

[11] Patent Number: 4,856,423

[45] Date of Patent: Aug. 15, 1989

[54] PORTABLE BARBECUE APPARATUS

[76] Inventor: Peter Burns, 39 Hobbs Avenue, Dalkeith, Western Australia, Australia, 6009

[21] Appl. No.: 35,481

[22] Filed: Apr. 7, 1987

[30] Foreign Application Priority Data

Apr. 8, 1986 [AU] Australia ............................ PH5373

[51] Int. Cl.[4] ............................................. A47J 37/10
[52] U.S. Cl. ................... 99/421 H; 99/449; 99/450; 126/30
[58] Field of Search ................. 99/357, 449, 448, 422, 99/450, 419, 421 A, 421 H; 126/9 R, 9 B, 11, 26, 25 R, 25 A, 29, 30, 137

[56] References Cited

U.S. PATENT DOCUMENTS

| 1,594,708 | 8/1926 | Briggs | |
|---|---|---|---|
| 1,666,293 | 4/1928 | Lorton | |
| 2,162,636 | 6/1939 | Peoples | 248/121 |
| 2,506,698 | 5/1950 | Beals | 99/339 |
| 2,827,846 | 3/1958 | Karkling | 99/339 |
| 2,940,439 | 6/1960 | Bartels et al. | 126/30 |
| 2,977,953 | 4/1961 | Dowdy | 126/30 |
| 3,162,113 | 12/1964 | Tallaksen | 99/446 |
| 3,498,210 | 3/1970 | O'Toole | 99/357 |
| 3,526,217 | 9/1970 | Garske et al. | 126/25 |
| 4,054,123 | 10/1977 | Corter | 99/446 |
| 4,065,085 | 12/1977 | Gellatly | 126/30 |
| 4,094,296 | 6/1978 | Beagley | 126/30 |
| 4,120,279 | 10/1978 | White | 99/340 |
| 4,269,164 | 5/1981 | Van Grinsuen et al. | 126/30 |
| 4,538,589 | 9/1985 | Preston | 126/30 |

FOREIGN PATENT DOCUMENTS

| 63134/65 | 3/1967 | Australia . |
| 2849243 | 5/1980 | Fed. Rep. of Germany . |
| 2298301 | 8/1976 | France . |

Primary Examiner—Henry J. Recla
Assistant Examiner—Linda J. Sholl
Attorney, Agent, or Firm—John S. Hale

[57] ABSTRACT

Cooking apparatus comprising a stake having a first end arranged to be driven into the ground in upright manner and a support for supporting items to be cooked or heated connected to said stake in such manner that said support is arranged to be swivelled about said stake. The support may be in the form of one or more of several embodiments. In each such embodiment, the support comprises a sleeve arranged to surround the stake and is rotatable with respect thereto. Further, the embodiments may be in the form of a barbecue tray, a hollow for a wok type receptacle, a rotisserie or an elongate member having a hook.

1 Claim, 2 Drawing Sheets

PORTABLE BARBECUE APPARATUS

The present invention relates to a cooking apparatus. In accordance with one aspect of the present invention there is provided a cooking apparatus comprising a stake having a first end arranged to be driven into the ground in upright manner and support means for supporting items to be coked or heated connected to said stake in such manner that said support means is arranged to be swivelled about said stake.

The present invention will now be described, by way of example, with reference to the accompanying drawings wherein.

Figure 1:
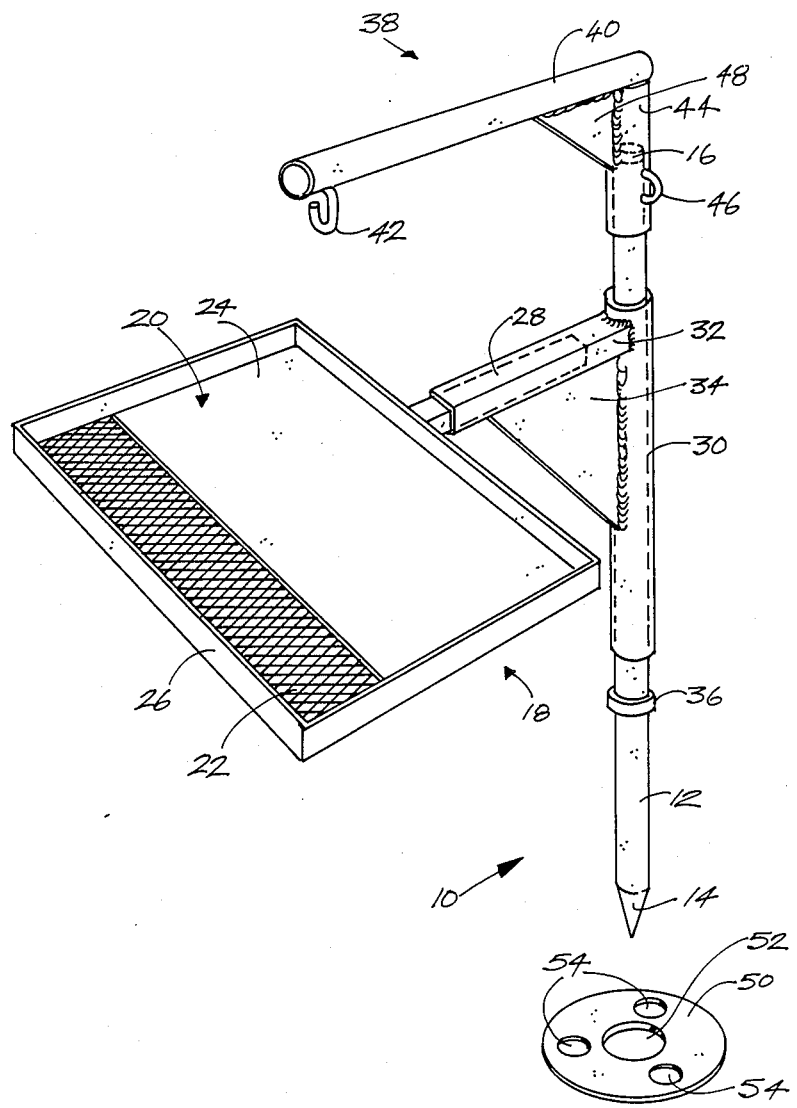
FIG. 1 is an upper perspective view of a cooking apparatus in accordance with the present invention showing first and second embodiments of the support means.

In FIG. 1 there is shown a cooking apparatus 10 comprising a stake 12 having a first, pointed end 14. The stake 12 also has a second, chamfered end 16, which can be seen in phantom lines in FIG. 1. The best mode and preferred embodiment of the invention is shown in FIG. 1 and includes the support means 18.

The apparatus 10 further comprises support means 18 for supporting items to be cooked or heated.

The support means 18 shown in FIG. 1 comprises a generally flat barbecue tray 20, conveniently in the form of a part mesh grille 22 and a part solid plate 24. However, the barbecue tray 20 may be of any suitable form.

Further, the barbecue tray 20 also preferably comprises a surrounding angle iron 26. The angle iron 26 may be attached to the edges of the barbecue tray 20, i.e. by welding, turning, or be formed integrally with the edges of the barbecue tray 20.

The barbecue tray 20 has connected thereto a projecting member 28, shown in phantom lines in FIG. 1. The projecting member 28 may be connected to an edge of the barbecue tray 20 or to the angle iron 26, if such is present. The connection may be effected by any suitable means, e.g. welding.

A tubular sleeve 30 is arranged to surround the stake 12 and be rotatable with respect thereto, and is open at both its ends. The tubular sleeve 30 has a tubular member 32 connected to the top thereof, e.g. by welding. The tubular member 32 projects from the top of the tubular sleeve 30, substantially at right angles thereto and to the stake 12. A triangular gusset 34 provides additional support for the tubular member 32. The triangular gusset 34 is connected to the tubular sleeve 30 and tubular member 32, e.g. by welding. In FIG. 1, the projecting member 28 and the tubular member 32 are shown as having a square profile. However, any shape which allows the projecting member 28 to be non-rotatably retainable in the tubular member 32 may be employed.

The stake 12 is provided with a stop ring 36. The stop ring 36 is conveniently welded to the stake 12.

The apparatus 10 may, preferably, further comprise an additional second support means 38 for supporting items to be cooked or heated.

The support means 38 comprises an elongate member 40, which may be of tubular form, provided with a hook 42 at one end thereof.

The end of the elongate member 40 remote from the end provided with the hook 42 is connected to the top of a tubular sleeve 44, substantially at a right angle thereto and to the stake 12. The hook 42 is intended to have a container containing food or fluid, to be cooked or heated, suspended therefrom.

The tubular sleeve 44 is closed at the top end thereof, by the elongate member 40, and open at the bottom end, and may be provided with guide means, preferably in the form of an eye 46. The tubular sleeve 44 is arranged to fit over the chamfered end 16 of the stake 12 and surround the stake 12 and be rotatable with respect thereto.

A triangular gusset 48 provides additional support for the elongate member 40. The gusset 48 is connected to the elongate member 40 and the tubular sleeve 44, e.g. by welding.

The apparatus 10 may further comprise an anchor plate 50. The anchor plate 50 is provided with a central aperture 52, of a size that may accommodate the stake 12. The anchor plate 50 is also provided with additional, smaller apertures 54 around its periphery.

Figure 2:
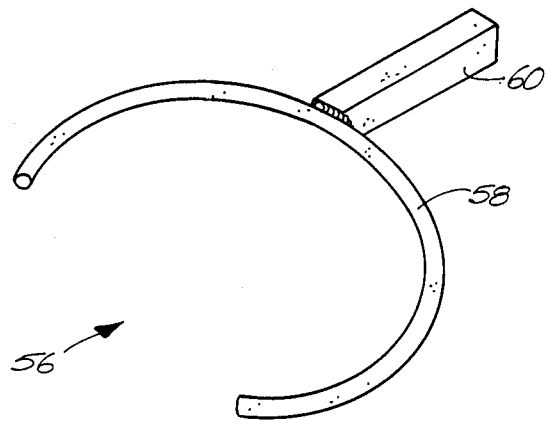
FIG. 2 is an upper perspective view of a third embodiment of the support means.

In FIG. 2, there is shown a third embodiment of a support means 56, for supporting items to be cooked or heated.

The support means 56 comprises a metal rod 58 of arcuate form. The metal rod 58 is connected to a projecting member 60, e.g. by welding.

The projecting member 60 is of similar form to the projecting member 28, shown in FIG. 1, and is also arranged to be non-rotatably retainable in the tubular member 32 of the apparatus 10.

The support means 56 is specifically designed to support a wok type cooking receptacle.

Figure 3:
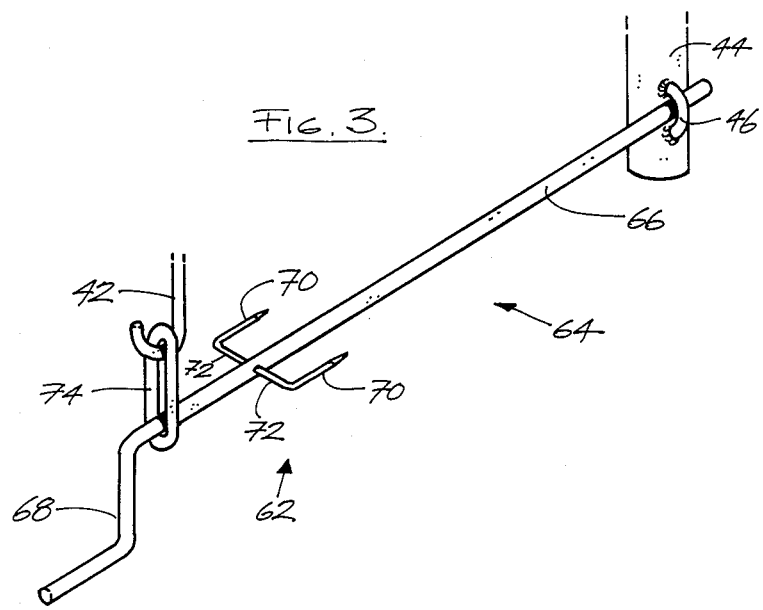
FIG. 3 is an upper perspective view of a fourth embodiment of the support means, and means of attachment thereof in the apparatus.

In FIG. 3 there is shown a fourth embodiment of a support means 62 for supporting items to be cooked or heated.

The support means 62 is in the form of a rotisserie 64. The rotisserie 64 comprises a spit 66, provided with an integral handle portion 68. The handle portion 68 may be encassed in an insulating material, e.g. wood, (not shown). The spit 66 is provided with a pair of prongs 70, parallel thereto. The prongs 70 are each connected to the spit 66 by offset portions 72.

The rotisserie 64 further comprises an extension link 74 which passes over the spit 66 and is located on the portion of the spit 66 between the handle 68 and the prongs 70.

The manner of assembly of the apparatus 10 will now be described, firstly with specific reference to FIG. 1 and the first and second embodiments of the support means shown therein.

In use, the anchor plate 50 is placed on the ground at the position where it is desired to locate the stake 12. Then, the stake 12, without the tubular sleeves 30 and 44 mounted thereon, is inserted into the aperture 52 of the anchor plate 50 and driven into the ground, with the pointed end 14 lowermost, in such manner that the stake 12 projects upwardly from the ground in upright manner.

The chamfered end 16 allows the stake 12 to be driven into the ground with a hammer, without the end becoming frayed. Anchor pegs (not shown) are inserted into the smaller apertures 54 to hold the anchor plate 50 securely to the ground. The anchor plate 50 reduces the possibility of the stake 12 moving from its desired position once it has been driven into the ground in the manner above described. The anchor plate 50 may, however, be omitted if it is not required, e.g. in cases where the soil is sufficiently firm.

Next, the tubular sleeve 30 is placed over the chamfered end 16 of the stake 12, with the tubular member 32 uppermost and without the barbecue tray 20 attached. The tubular sleeve 30 slides down over the stake 12 until its lower end abuts the stop ring 36. However, in FIG. 1 the tubular sleeve 30 is shown at a distance above the stop ring 36, prior to abutting therewith, for clarity.

Next, the barbecue tray 20 is placed in position by inserting the projecting member 28 into the tubular member 32.

Finally, the support means 38 may be added, if required, by placing the tubular sleeve 44 over the chamfered end 16 of the stake 12 with the elongate member 40 uppermost. The tubular sleeve 44 slides down over the stake 12 until the elongate member 40 abuts the chamfered end 16 of the stake 12. However, in FIG. 1 the tubular sleeve 44 is shown at a distance above the chamfered end 16 of the stake 12, prior to the elongate member 40 abutting therewith, for clarity.

The tubular sleeves 30 and 44 are mounted on the stake 12 in such manner that they are each rotatable through 360° about the stake 12.

The variation in the manner of assembly of the apparatus 10 will now be described when either the support means 56 of the third embodiment shown in FIG. 2 or the support means 62 of the fourth embodiment shown in FIG. 3 is used.

When the support means 56 is used, in place of the support means 18 of the first embodiment, the projecting member 60 is inserted into the tubular member 32. The remainder of the assembly operation remains the same as above described.

When the support means 62 is to be used in the apparatus 10 to form the rotisserie 64, a short length of the end of the spit 66, remote from the handle 68, is inserted into the eye 46 carried by the sleeve 44. The extension link 74 carried by the spit 66 is placed over the hook 42, as shown in FIG. 3.

The manner of operation of the apparatus 10 will now be described firstly with specific reference to FIG. 1 and the first and second embodiments of the support means 18 and 38 shown therein.

Once the apparatus 10 has been assembled, as hereinbefore described, a fire is lit, or other suitable cooking or heating flame is provided, on the ground beside the stake 12.

The barbecue tray 20 is then swivelled away from the fire. This is possible due to the tubular sleeve 30 being rotatable with respect to the stake 12 and the lower end of the tubular sleeve 30 abutting the stop ring 36. The food to be cooked may then be arranged on the barbecue tray 20. Then, the barbecue tray 20 is swivelled back to overlie the fire so that the food may be cooked. When the cooking is complete, the barbecue tray 20 may be again swivelled away from the fire so that the food may be removed therefrom. The barbecue tray 20 may also be swivelled away from the fire when it is necessary to manipulate the food being cooked. The stop ring 36 is provided at a suitable position on the stake 12 such that when the lower end of the sleeve 30 abuts therewith, the barbecue tray 20 is provided a convenient distance above the fire.

If the support means 38 is also attached and it is desired to make use of it, the barbecue tray 20 is first swivelled away from the fire. A container, e.g. a kettle, may be then suspended from the hook 42 and the elongate member 40 swivelled, due to the tubular sleeve 44 being rotatable with respect to the stake 12 and the elongate member 40 abutting the chamfered end 16 of the stake 12, to overlie the fire. The elongate member 40 is of a length such that the hook 42 would overlie the barbecue tray 20 in its central region if the elongate member 40 was swivelled to overlie the barbecue tray 20. The variation in the manner of operation of the apparatus will now be described when either the support means 56 of the third embodiment, shown in FIG. 2, or the support means 62 of the fourth embodiment, shown in FIG. 3, is used.

When the support means 56 is used in place of the support means 18, a wok type cooking receptacle may be retained on the arcuate metal rod 58. The food to be cooked is placed in the cooking receptacle which is then heated by the fire to cook the food. The support means 58 is then used in a similar manner to that above described in connection with the support means 18. When the support means 62 is used to form the rotisserie 64, the food item to be cooked is placed on the spit 66, and retained thereon by engaging with the prongs 70. The end of the spit 66 is then inserted in the eye 46 and the extension link 74 is placed over the hook 42. The length of the hook 42 and extension link 74 and their relative vertical disposition with respect to the eye 46 is such that the spit 66 is in a substantially horizontal position when the rotisserie is assembled.

The barbecue tray 20 is then swivelled away from the fire, if it was being used, and the rotisserie 64 is then swivelled over the fire in its place.

The present invention allows for a variety of different types of cooking to be undertaken in the same apparatus without the need to disassemble the apparatus. The different forms of support means 18, 38, 56 and 62 are easily interchangeable once the basic parts of the apparatus 10 have been assembled.

Further, when a particular support means is not required it can be easily swivelled out of the way and then similarly swivelled back when required. It is even possible to use more than one of the different support means 18, 38, 56 and 62 at the same time. This may be done by having two fires on opposed sides of the stake 12.

Further, the feature of swivelling allows the support means to be swivelled away from the fire when it is necessary to attend to the food items being cooked. Thus, the user does not need to manipulate the food items in the close proximity of a flame and smoke.

Modifications and variations such as would be apparent to a skilled addressee are deemed within the scope of the present invention.

I claim:
1. Cooking apparatus comprising:
   a stake having a first end and a second end, said first end being arranged to be driven into the ground in an upright manner with said second end uppermost;
   stop means provided on said stake at a position remote from said second end;
   a first tubular sleeve comprising an upper end and a lower end arranged to slide over said second end of said stake so that said lower end of said first tubular sleeve abuts said stop means positioning said first tubular sleeve at fixed distances from said first and second ends respectively, of said stake;

a projecting member extending substantially at a right angle from said first tubular sleeve;

support means for supporting food to be cooked or a food container to be heated, said support means being provided with a support projecting member arranged to connect with said projecting member of said first tubular sleeve so that said support means is connected to said first tubular sleeve, said first tubular sleeve being freely rotatable about said stake in either direction form a stationary position, said lower end of said first tubular sleeve being constantly in abutment with said stop means and said stop means being the sole means of retaining said first tubular sleeve at said fixed distances from said first and second ends of said stake;

a second tubular sleeve having an upper end and a lower end;

an elongated member having a first end and second end extending from said second tubular sleeve substantially at right angles thereto and connected at said first end of said elongated member over said upper end of said second tubular sleeve to thereby close off said upper end; guide means provided on said second tubular sleeve and attachment means provided at said second end of said elongated member;

a spit connected to said guide means and said attachment means so that said spit is rotatably held in said guide means and said attachment means; and said second tubular sleeve being constructed to slide over said second end of said stake until said second end of said stake abuts with said elongated member that is connected over said upper end of said second tubular sleeve, said second tubular sleeve being freely rotatable about said stake in either a clockwise or counter-clockwise direction from a stationary position, said second end of said stake positioned in abutment with said elongated member regardless of movement, said elongated member being the sole means of preventing said second tubular sleeve from sliding further downwardly along said stake.

* * * * *